United States Patent [19]

Bridges

[11] Patent Number: 5,076,618
[45] Date of Patent: Dec. 31, 1991

[54] METHOD AND APPARATUS FOR SEALING PIPE JOINTS FROM THE INTERIOR THEREOF

[76] Inventor: Donald Y. Bridges, 3014 Creek Ct., Roswell, Ga. 30075

[21] Appl. No.: 421,145

[22] Filed: Oct. 13, 1989

[51] Int. Cl.⁵ .............................................. F16L 21/02
[52] U.S. Cl. .................................... 285/370; 285/910; 138/97
[58] Field of Search ............... 285/370, 371, 397, 398, 285/109, 910; 277/101, 208, 209, 210, 192, 197; 138/97, 98

[56] References Cited

U.S. PATENT DOCUMENTS

| | | |
|---|---|---|
| 1,607,943 | 11/1926 | Carson et al. |
| 2,913,262 | 11/1959 | Cenzo et al. |
| 3,153,550 | 10/1964 | Hollett. |
| 3,700,265 | 10/1972 | Dufour et al. ............ 138/97 X |
| 3,915,197 | 10/1975 | Piccirilli .................. 138/97 |
| 3,960,395 | 6/1976 | Cirule et al. ............. 285/370 |
| 4,347,018 | 8/1982 | Wrightson et al. ...... 138/97 X |
| 4,360,227 | 11/1982 | Bridges. |
| 4,664,428 | 5/1987 | Bridges ..................... 285/373 |
| 4,927,189 | 5/1990 | Burkit ....................... 285/109 |

OTHER PUBLICATIONS

Brochure of Miller Pipeline Corp. "WEKO-SEAL Internal Joint System for Water and Wastewater Piping," (Rev. 3/88) (4 pages).
Brochure of Amex Gesellschaft Fur Rohrleitungsbauteile und Anlagentechnik mbH, "AMEX-10-Reconstruction and Sealing System for Accessible Pipelines; AMEX 32-400 Foil Relining for Non-accessible Pipelines" (20 pages).
Brochure of Brico Industries, Inc., "DEPEND-O-LOK" Mechanical Coupling Systems, catalog 202 (10 pages).

*Primary Examiner*—Dave W. Arola
*Assistant Examiner*—Heather Chun
*Attorney, Agent, or Firm*—Jones, Askew & Lunsford

[57] ABSTRACT

A pipe coupling and method for sealing pipe joints or leaks from the interior of the pipe line are disclosed. A continuous gasket member is positioned against the inside surface of the pipe line on each side of the leak location, a coupling member including at least one axial joint within the line is positioned to span the continuous gasket members, an axial gasket is positioned at the axial joint, and the coupling member is expanded to compress the continuous gasket members and the axial gasket member to prevent leakage of fluid from within the pipe line. The invention provides a convenient apparatus and method for repairing leaks in pipe lines when the exterior of the pipes cannot be conveniently exposed and the interior of the pipe line is accessible.

25 Claims, 3 Drawing Sheets

U.S. Patent    Dec. 31, 1991    Sheet 1 of 3    5,076,618
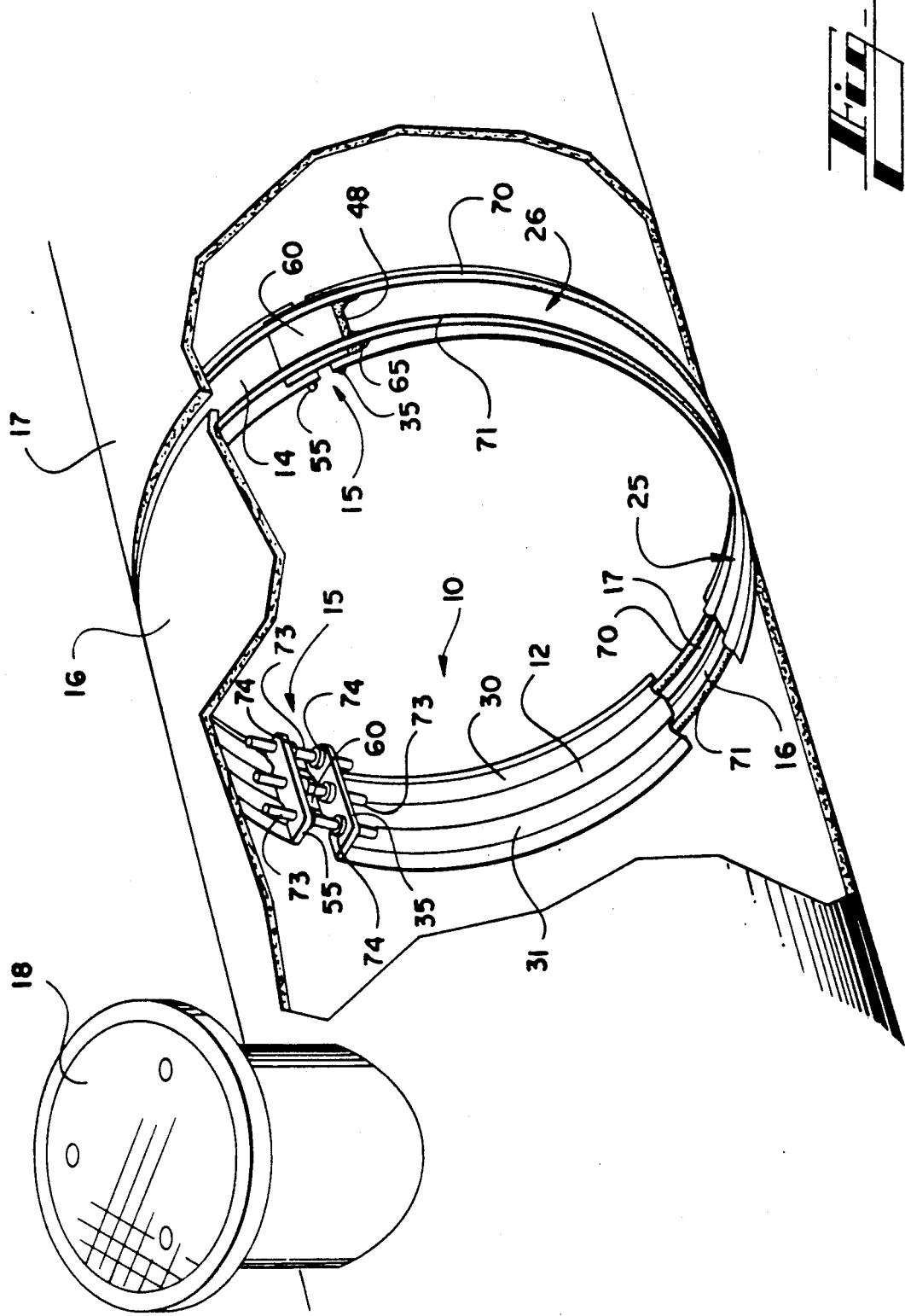
Fig_1

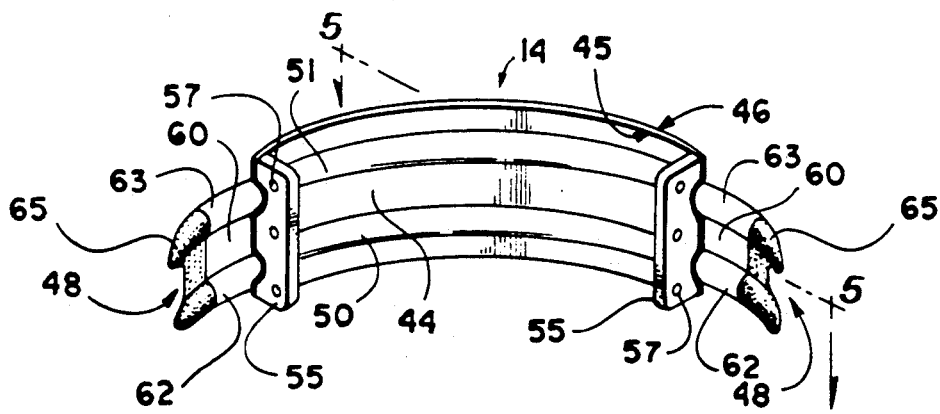
FIG_2
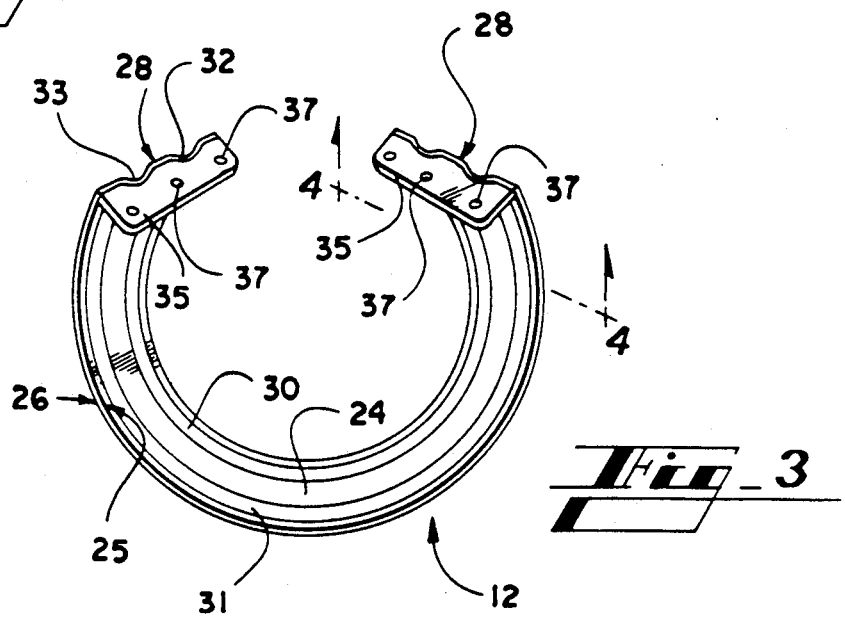
FIG_3
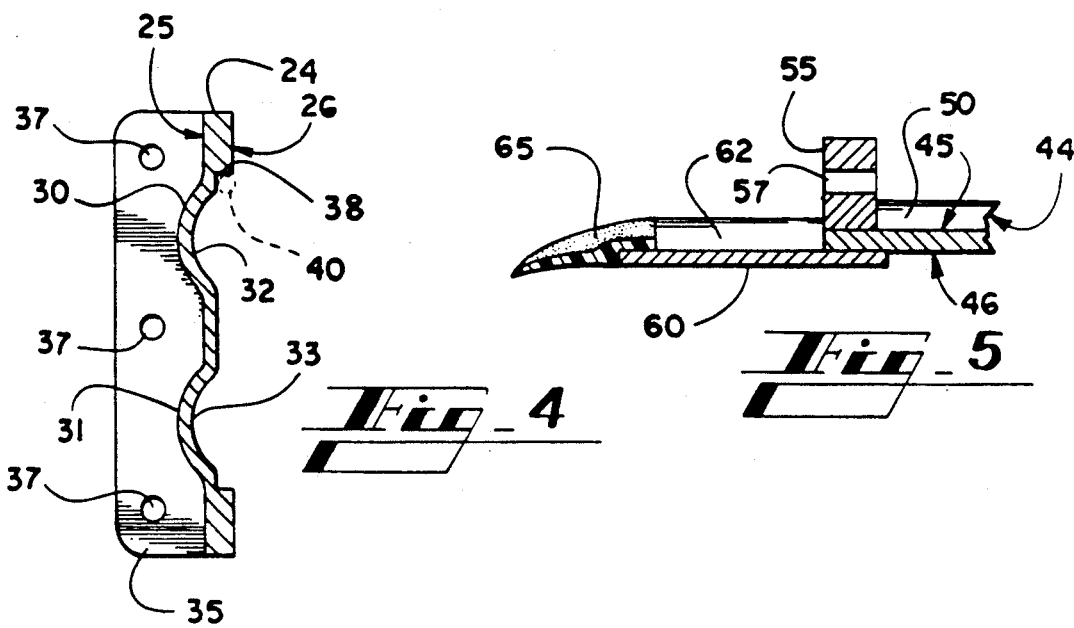
FIG_4
FIG_5

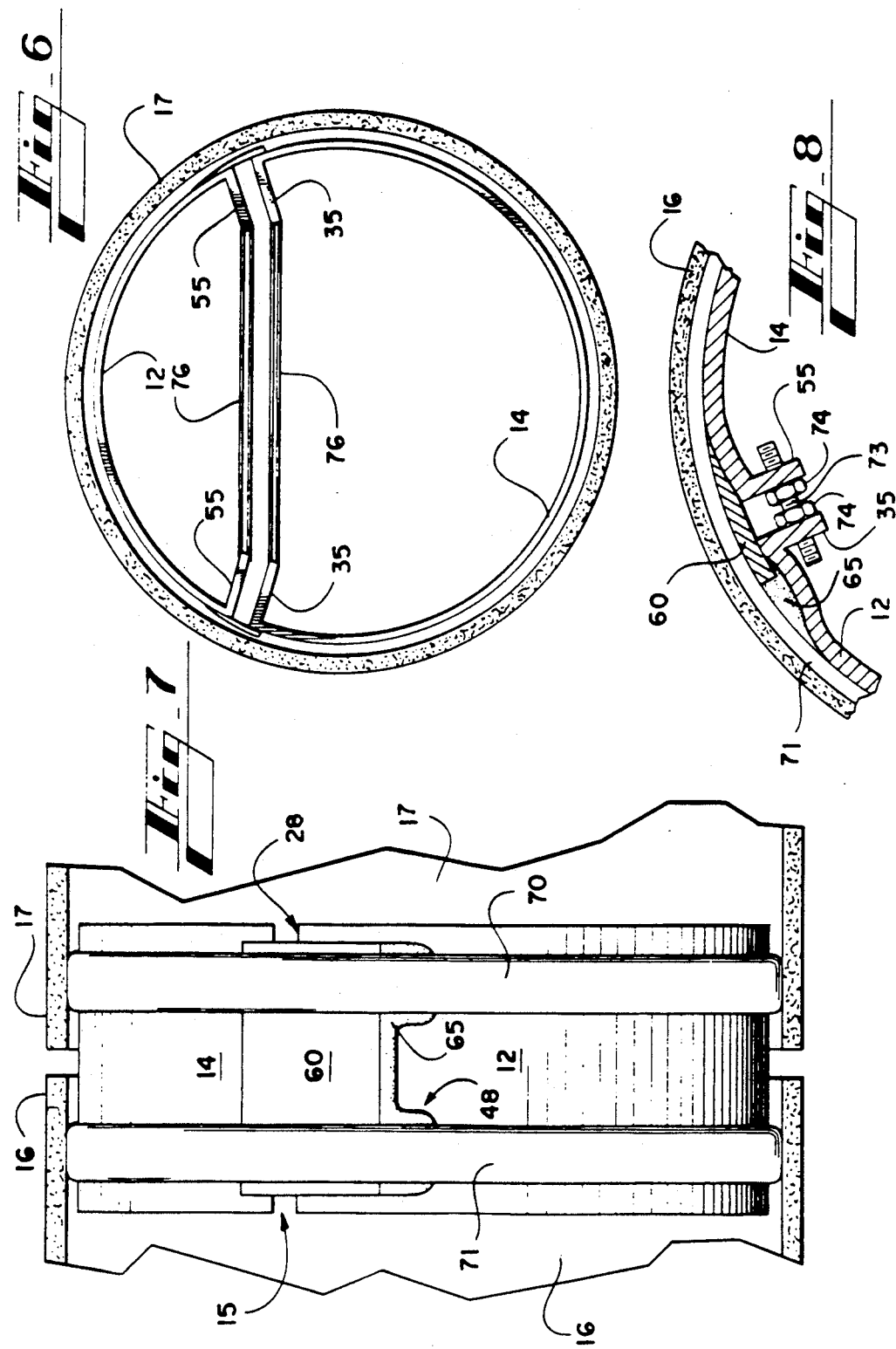

METHOD AND APPARATUS FOR SEALING PIPE JOINTS FROM THE INTERIOR THEREOF

FIELD OF INVENTION

The present invention relates to a method for sealing pipe joints or leaks in pipes when access can be gained to the interior of the pipes, and more particularly relates to a coupling to be applied to the interior wall of a pipe, covering a leak therein or spanning a joint between adjacent pipe ends.

BACKGROUND OF THE INVENTION

Much effort has been directed to development of couplings for sealing joints between pipe sections. Many pipe lines must be assembled from a series of pipe sections abutted end-to-end, and require that fluids conveyed the length of the pipeline not leak through the joints. Typically, a coupling for joining two abutting pipe ends fits around the exterior of the pipe and spans the adjacent ends.

An example of such a coupling is shown in U.S. Pat. No. 4,664,428, which discloses the use of an axial gasket along edges of a sealing plate fitted under the axial joint in the pipe coupling, or positioned along an axial edge of the coupling which is spaced under another axial edge of the coupling. Couplings embodying these concepts have been very useful in sealing pipe joints from the outside of the pipes with an apparatus that can be successfully installed by relatively unskilled workers.

Other exterior pipe couplings are shown in U.S. Pat. Nos. 2,913,262 and 3,153,550, which provide an axial gasket member within axial joints of the coupling between o-rings which surround the pipe ends. Another approach shown in U.S. Pat. No. 1,607,943 and in French patent No. 355,620 has been to provide an annular central web connecting the o-rings and completely surrounding the pipe ends. U.S. Pat. No. 4,360,227 discloses a pipe coupling in which a unitary gasket is provided including o-rings for surrounding the pipe ends joined by a web only in the area of the axial slit of the coupling.

Joints in metal pipe lines are often welded, whereas joints in concrete pipe lines often are sealed by o-rings. Installation of exterior couplings to repair such joints can be very inconvenient in the case of leaking joints in buried pipe lines. The pipe joint must be completely excavated to allow repair of leaks, and the heavy equipment typically used for such excavation must not damage the pipe ends. Furthermore, it may be quite difficult to determine the location of a leak along such a pipe line. Thus, there has been a need in the art for a method and a pipe coupling for sealing leaks in pipe lines without providing access to the exterior of the pipe line at the location of the leak. Many pipe lines exist which are large enough to permit access to the interior of the pipe.

SUMMARY OF THE INVENTION

The present invention meets the above-described need in the art by providing a coupling and a method for sealing pipe joints or leaks in pipes from the interior of the pipe line. The present invention is an improvement in the pipe coupling shown in U.S. Pat. No. 4,664,428, and provides a method of using the type of coupling shown in U.S. Pat. No. 4,664,428 to seal a pipe from its interior.

Generally described, the present invention provides a method and apparatus for sealing a leak location in a pipe line, whether the leak location be the site of a joint between adjacent pipe ends or a leak in the body of one pipe section. The method according to the invention comprises positioning a continuous gasket member against the inside surface of the pipe line on each side of the leak location, positioning a coupling member including at least one axial joint within the pipe line so as to span the continuous gasket members, positioning an axial gasket member at the axial joint extending between the continuous gasket members and positioned between the coupling and the continuous gasket members, and expanding the coupling member to compress the continuous gasket members and the axial gasket member so as to prevent leakage of fluid from within the pipe line.

According to a preferred embodiment, the axial joint of the coupling is defined by overlapping axial edges of the coupling, and the step of expanding the coupling comprises forcing the overlapping axial edges closer to one another to enlarge the diameter of the coupling and thus compress the continuous gasket members against the inside wall of the pipeline. The step of forcing the overlapping edges closer to one another may be accomplished by positioning flanges on the coupling and forcing the flanges apart by, for example, the use of bolts threaded on rods extending between the flanges. In the preferred configuration, an axial gasket is positioned along the overlapping edge closest to the interior wall of the pipeline, so that the coupling presses the axial gasket against the pipewall and the continuous gasket members, which may be o-rings.

According to the preferred method, the coupling has two axial joints formed at the ends of two sections of the coupling. When placed together, the two sections extend around the interior of the pipeline. Each of these coupling sections may be contracted by drawing the ends of each section toward one another. When the sections are in position, they can be allowed to expand against the walls of the pipeline.

The invention also provides a preferred pipe coupling for carrying out the above-described method, comprising a coupling member having an inner surface and an outer surface, and including at least one axial joint defined by a first axial edge and a second axial edge; means for joining the first axial edge to the outer surface of the coupling member at a location spaced apart from the second axial edge, such that the coupling member is urged against the interior of the pipeline, and such that the second axial edge is positioned adjacent to the inner surface of the coupling member between the coupling member and the pipeline at a location spaced apart from the first axial edge; a pair of continuous gasket members, positioned to be compressed between the coupling member and the interior of the pipeline, and sealing gasket means for preventing passage of fluid from the outer surface of the coupling member through a leak between the continuous gasket members, comprising an axial gasket member adhered to the outer surface of the coupling member adjacent to the second axial edge and extending beyond the second axial edge to a position spaced outwardly from the second axial edge in the region of the continuous gasket members.

Thus, it is an object of the present invention to provide an improved method and apparatus for sealing leaks in pipe lines.

It is a further object of the present invention to provide a method and apparatus for sealing joints or leaks in pipe lines from the interior of the pipe line.

It is a further object of the present invention to provide a convenient method for repairing leaks in pipe lines or sealing joints between pipe sections when the exterior of the pipes cannot be conveniently exposed.

It is a further object of the present invention to provide a method and apparatus for sealing leaks from the interior of a pipe line, which can be carried out by relatively unskilled persons.

Other objects, features and advantages of the present invention will become apparent upon a review of the following detailed description of an embodiment of the invention, with reference to the appended drawing.

BRIEF DESCRIPTION OF THE DRAWING

FIG. 1 is a pictorial view of a pipe coupling embodying the present invention spanning a pipe joint, with parts of the adjacent pipe sections broken away to show interior detail.

FIG. 2 is a pictorial view of a top section of a pipe coupling embodying the invention, showing the upper surface thereof.

FIG. 3 is a pictorial view of a lower section of a pipe coupling embodying the present invention, showing the outer surface thereof.

FIG. 4 is a cross-sectional view taken along line 4—4 of FIG. 3.

FIG. 5 is a cross-sectional taken along line 5—5 of FIG. 2.

FIG. 6 is a diagrammatic side view of the top and lower sections of the pipe coupling in contracted configuration.

FIG. 7 is a side view of the coupling installed between two pipe ends, with one half of the pipe ends broken away to expose the coupling.

FIG. 8 is an end cross sectional view of an axial joint of the coupling installed within a pipe line.

DETAILED DESCRIPTION

Referring now in more detail to the drawing, in which like numerals refer to like parts through the several views, FIG. 1 shows a coupling member 10 installed within a pipe line according to the method of the present invention. The coupling member 10 includes a lower section 12 an upper section 14, which are separated by a pair of axial joints 15. The coupling member 10 is positioned within a pipe line spanning adjacent pipe ends 16 and 17. An example of a pipe line is shown in which the present invention can be utilized, that is, a concrete buried pipe line having a manhole 18 for access. Thus, if the joint between the pipe ends 16 and 17 begins to leak, it can be sealed without excavating around the buried pipe joint. However, it should be understood that the present invention can be utilized to seal cracks or holes, and is not limited to spanning and sealing adjacent pipe ends.

Referring to FIGS. 2 and 3, the lower section 12 of the coupling member 10 consists of an arcuate plate 24 having an outer surface 25 and an inner surface 26. The outer surface is that surface which faces away from the wall of the pipe, that is, faces toward the interior of the pipe line. The inner surface of the coupling is the surface facing the interior wall of the pipes. The lower coupling section 12 defines two axial edges 28 at the ends of the arcuate plate 24. These axial edges 28 provide the first edges of the axial joints of the coupling member 10, the second axial edges of the joints being provided by the upper section 14 of the coupling member 10.

The arcuate plate 24 is formed to provide a pair of elongate arcuate protrusions 30 and 31, similar to those shown and described in U.S. Pat. No. 4,664,428, which is incorporated herein by reference in its entirety. The formation of the arcuate protrusions 30 and 31 results in the formation of corresponding arcuate grooves 32 and 33 under the protrusions 30 and 31, respectively. The grooves 32 and 33 are thus formed in the inner surface of the lower section 12 of the coupling member. At the first axial edges 28 described above, a pair of closure plates or flanges 35 are attached to the arcuate plate 24. The closure plate 35 extend radially from the outer surface 25 of the arcuate plate 24, toward the interior of the pipe line. A plurality of bolt holes 37 are formed in the closure plate 35.

FIG. 4 shows a preferred cross section of the lower section 12 of the coupling member 10. In some cases, it may be possible to affix a rod 40, shown in phantom on FIG. 4, to the interior wall of the pipe line on either side of the leak location. A shoulder 38 may then be formed at the outer edge of each of the grooves 32 and 33 to provide a better gripping force on the rods 40. While rods 40 may be appropriate for metal pipes in some situations, the use of such rods would not be appropriate if the material of the pipe line was not suitable for attachment or if it is intended that adjacent pipe ends be able to move somewhat within the coupling. It should be understood that the coupling can function in normal circumstances when placed against smooth interior pipe walls.

The upper or top section 14 of the coupling member 10 includes an arcuate plate 44 having an outer surface 45 and an inner surface 46. The arcuate plate 44 with extensions described below terminates at each end in a pair of axial edges 48 which provide the second axial edges of the coupling joints 15 referred to above and shown in FIG. 1. Elongate arcuate protrusions 50 and 51 are formed in the plate 44, with corresponding arcuate grooves 52 and 53 in the inner surface of the plate 44. These grooves and protrusions are aligned with the protrusions 30 and 31 and the grooves 32 and 33 of the lower section 12 when the coupling is assembled. A pair of closure plates 55 are attached to the outer surface of the plate 44 at positions spaced inwardly from the second axial edges 48. A plurality of bolt holes 57 corresponding in location to the bolt holes 37 of the closure plate 35 are provided in the closure plate 55.

The end portions of the upper section 14 which terminate in the second axial edges 48 may be provided as shown by extension plates 60. The extension portion 60 may be a separate plate attached by welding or the like, as shown in the drawing or may be an integral portion of the arcuate plate 44. The extensions portions 60 begin at the location of the closure plate 55. Arcuate protrusions 62 and 63 with corresponding arcuate grooves, are formed as continuations of the protrusions 50 and 51. Each of the extension portions 60 includes an axial gasket 65 adhered to the outer surface of the coupling section in a position to extend beyond the axial edges 48 in the region of the protrusions 62 and 63, as shown in FIG. 5.

The coupling member 10 also includes a pair of continuous gasket members 70 and 71, such as o-rings, which are positioned around the interior of the pipe wall, one on either side of the leak location. The gaskets 70 and 71 may be integrally formed o-rings, or may be assembled on the job site from lengths of gasket material. Any appropriate gasket cross section may be utilized.

The coupling member 10 is completed by fasteners for connecting the two axial joints 15, consisting of a plurality of threaded rods 73 extending through the bolt holes 37 of both closure plates 35 and 55. Each threaded rod 73 carries two nuts 74 positioned on the threaded rod between the closure plates. The nuts thus may be turned outwardly along the threaded rod 73 to force the closure plates 35 and 55 apart.

The coupling member 10 of the present invention is usually assembled during its installation at a job site. Preferably, the lower section 12 and upper section 14 of the coupling member are individually contracted to make it easier to position them within the pipe line and to position the o-rings 70 and 71 between the coupling member and the interior wall of the pipes. This is preferably accomplished by passing metal bands 76 of the type used in binding various articles for shipment through bolt holes in the closure plates 35 and 55. As shown in FIG. 6, a metal band 76 is passed through a bolt hole 37 of each of the closure plates 35 of the lower section 12. The ends of the metal band 76 are joined into a loop and then tightened using a conventional tool (not shown). When the loop of the band 76 is sufficiently tightened to draw the first axial ends of the lower section 12 into a configuration smaller than the diameter of the pipe line being fixed, the metal band is crimped in place, again using a conventional tool. The same process is repeated to contract the upper section 14 by looping a metal band through bolt holes 57 in the closure plate 55.

The o-rings 70 and 71 and the sections of the coupling member 10 may be placed in position in any convenient sequence. For example, the o-rings may be placed around the lower section 12 within the arcuate grooves 32 and 33, and then placed together in the bottom portion of the pipe line spanning the leak location. In the installation shown in FIG. 1, the lower section 12 would be positioned so that the grooves 32 and 33 and the o-rings 70 and 71 would span the gap between the adjacent pipe ends 16 and 17. Then the upper section 14 may be lifted into place, also in its contracted configuration, under the o-rings 70 and 71, with the closure plate 55 resting on the closure plate 35. The o-rings would then be aligned within the arcuate grooves 52 and 53. The extension plates 60 would thus be positioned against the inner surface 26 of the lower section 12 and between such inner surface and the o-rings 70 and 71. Since the axial gaskets 65 are attached to the upper surface of the plate 60 but extend beyond the axial edge 48 in the region of the o-rings, the axial gaskets 65 are in position to bear against the o-rings and provide an axial seal preventing liquid from passing between the plate 60 and the inner surface of the lower section 12 between the two o-rings.

When all elements have been aligned to the satisfaction of the installer, the bands 76 can be cut, allowing the sections 12 and 14 of the coupling member 10 to expand to approximately conform to the interior shape of the pipe line. The threaded rods 73 may then be inserted through corresponding openings 37 and 57 in the adjacent closure plates 35 and 55, as shown in FIG. 1, with two nuts 74 threaded onto each rod 73 between the closure plates. Alternately, the threaded rods and nuts may be placed in position prior to cutting the bands 76 if more convenient. Installation of the coupling and sealing of the pipe is completed by turning the nuts 74 to urge the closure plates 35 and 55 away from each other. This expands the circumference of the coupling member 10 and provides a radially outward force on the o-rings and axial gaskets 65. The action of forcing the closure plates apart in fact moves the first and second axial edges of the lower and upper sections, respectively, closer to one another. Once the coupling is sufficiently tightened against the interior wall of the pipe, the lower section 12 will be firmly pressed against the extension plates 60 so that the portion of the axial gasket 65 extending beyond the second axial edge 48 will be pressed in sealing relationship against the o-rings, and the portion of the axial gasket 65 positioned on the outer surface of the plate 60 will form a seal between the upper and lower sections of the coupling member between the o-rings. As may be seen in FIG. 7, no fluid passing within the pipe line will be able to pass through the axial joints 15 of the coupling or pass the o-rings to reach the leak in the pipe line or the joint between the pipe ends.

Although in the preferred embodiment shown, the coupling member 10 consists of two arcuate sections, it should be understood that a coupling could be fabricated from a single section having one axial joint, or multiple sections. Furthermore, a coupling embodying the present invention could be formed to seal the interior of non-circular pipes.

It should also be understood that the structure of the pipe coupling and its method of installation are sufficiently straightforward so that a relatively unskilled person can successfully seal a leak in a pipe line using the invention. Furthermore, the first and second axial edges can be expanded using means other than the closure plates, and when closure plates are used they can be forced apart by means other than the bolts and threaded rods shown in the drawing.

While this invention has been described in detail with particular reference to preferred embodiments thereof, it will be understood that variations and modifications can be affected within the spirit and scope of the invention as described hereinbefore and as defined in the appended claims.

I claim:

1. A method of sealing a leak location in a pipeline, comprising the steps of:

positioning two discrete, continuous gasket members against the inside surface of said pipeline one on each side of said leak location each of said gasket members having an inner side facing the inside of said pipeline and an outer side facing away from the inside of said pipeline;

positioning a coupling member including at least one axial joint defined by a first axial edge and a second axial edge within said pipeline so as to span said continuous gasket members, said coupling member having an inner side facing the inside of said pipeline and an outer side facing away from the inside of said pipeline;

positioning an axial gasket member at said axial joint between said continuous gasket members and between said coupling and said continous gasket members, such that said second axial edge is positioned adjacent to the inner side of said coupling member between said coupling member and the outer side of said gasket members at a location spaced apart from said first axial edge; and expanding said coupling member to compress said continuous gasket members and said axial gasket member so as to prevent leakage of fluid from within said pipeline.

2. A method of sealing a pair of adjacent pipe ends, comprising the steps of:
positioning two discrete, continuous gasket members, one against the inside surface of each of said pipes adjacent to said pipe ends, each of said gasket members having an inner side facing the inside of said pipe ends and an outer side facing away from the inside of said pipe ends;
positioning a coupling member including at least one axial joint defined by a first axial edge and a second axial edge within said pipe ends so as to span the interior of said pipe ends and said continuous gasket members, said coupling member having an inner side facing the inside of said pipe ends and an outer side facing away from the inside of said pipe ends;
positioning an axial gasket member at said axial joint between said continuous gasket members and between said coupling and said continuous gasket members such that said second axial edge is positioned adjacent to the inner side of said coupling member between said coupling member and the outer side of said gasket members at a location spaced apart from said first axial edge; and
expanding said coupling member to compress said continuous gaskets members and said axial gasket member so as to prevent leakage of fluid from within said pipes.

3. The method of claim 2, wherein said step of positioning said coupling comprises positioning said second axial edge between said coupling and said pipes at a location spaced apart from said first axial edge, and wherein said step of positioning said axial gasket member comprises positioning said axial gasket member along said second axial edge such that said axial gasket member bears against said coupling and said continuous gasket members.

4. The method of claim 3, wherein said step of expanding said coupling comprises forcing said first and second axial edges closer to one another.

5. The method of claim 4, wherein said coupling includes a first flange extending into said pipes from the outer side of said coupling at a location spaced farther from said second axial edge than said first axial edge is spaced from said second axial edge, and a second flange extending into said pipes from said first axial edge, and wherein said step of forcing said first and second axial edges closer to one another comprises forcing said first and second flanges apart.

6. The method of claim 3, wherein said step of positioning said axial gasket member along said second axial edge comprises positioning said axial gasket member on the outer surface of said coupling adjacent to said second axial edge and extending beyond said second axial edge in the region of said continuous gasket members.

7. The method of claim 6, wherein said second axial edge defines a surface extending radially with respect to said coupling, and wherein said axial gasket member is shaped to extend from said outer surface of said coupling along the radial surface of said second axial edge.

8. The method of claim 2, further comprising contracting said coupling before positioning said coupling to span the interior of said pipe ends, and wherein said step of positioning said coupling includes releasing said coupling from its contracted configuration.

9. The method of claim 8, wherein said step of contracting each of said sections comprises drawing an end of said section toward another end of said section.

10. The method of claim 2, wherein said coupling member includes two of said axial joints.

11. The method of claim 10, wherein said coupling member is defined by two sections extending between said axial joints, and wherein said step of positioning said coupling member comprises positioning one of said sections against a lower portion of said pipe ends, and then positioning the other of said sections on top of said one section.

12. The method of claim 11, wherein said axial joints of said coupling member are each defined by a first axial edge of said lower section and a second axial edge of said top section, wherein said step of positioning said coupling member comprises positioning said second axial edges between said lower section and said pipes at a location spaced apart from said first axial edges, and wherein said step of positioning said axial gasket members comprises positioning said axial gasket members along said second axial edges.

13. The method of claim 10, further comprising contracting each of said sections of said coupling member before positioning said sections to span the interior of said pipe ends, and wherein said step of positioning said coupling member includes releasing said sections from their contracted configurations.

14. A pipe coupling for sealing a pair of adjacent pipe ends from an interior wall thereof, comprising:
a coupling member having an inner surface facing the interior walls of said pipe ends and an outer surface facing away from the interior wall of said pipe ends, and including at least one axial joint defined by a first axial edge and a second axial edge;
means for urging said first axial edge against the outer surface of said coupling member at a location spaced apart from said second axial edge, such that said coupling member is urged against the interior of said pipe ends, and such that said second axial edge is positioned adjacent to the inner surface of said coupling member between said coupling member and said pipe ends, at a location spaced apart from said axial edge;
a pair of continuous gasket members, one positioned to be compressed between said coupling member and the interior of each of said pipe ends; and
sealing gasket means for preventing passage of fluid from the outer surface of said coupling member between said pipe ends, comprising an axial gasket member secured to the outer surface of said coupling member adjacent to and sealingly engaging said second axial edge and extending beyond said second axial edge to a position spaced circumferentially from said second axial edge in the region of said continuous gasket members.

15. The pipe coupling of claim 14, wherein said means for joining said first axial edge to the outer surface of said coupling member comprises:
a first flange extending outwardly from said coupling member at said location spaced apart from said second axial edge;
a second flange extending outwardly from said coupling member at said first axial edge; and
means for urging said flanges apart.

16. The pipe coupling of claim 14, wherein said coupling member includes two of said axial joints defined by two coupling sections extending between said axial joints.

17. The pipe coupling of claim 14, wherein said second axial edge defines a surface extending radially with respect to said coupling, and wherein said axial gasket member extends from said outer surface of said coupling to said radial surface and is adhered to said radial surface of said second axial edge.

18. An apparatus for sealing a leak location in a pipe line from the interior thereof, comprising:
a pair of discrete, continuous gasket members, one positioned against the inside surface of said pipe line on each side of said leak location, each of said gasket members having an inner side facing the inside surface of said pipe line and a outer side facing away from the inside surface of said pipe line;
a coupling member including at least one axial joint defined by a first axial edge and a second axial edge positioned within said pipe line so as to span said continuous gasket members, said coupling member having an inner side facing the inside surface of said pipe line and an outer side facing away from the inside surface of said pipe line;
an axial gasket member positioned at said axial joint between said continuous gasket members and between said coupling and said continuous gasket members, such that said second axial edge sealingly engages said axial gasket member and is positioned adjacent to the inner side of said coupling member between said coupling member and the outer side of said continuous gasket members at a location spaced apart from said first axial edge; and
means for expanding said coupling member so as to compress said continuous gasket members and said axial gasket member and prevent leakage of fluid from within said pipe line.

19. The apparatus of claim 18, wherein said axial gasket member is non-cylindrical.

20. A method of sealing a pair of adjacent pipe ends, comprising the steps of:
positioning a continuous gasket member against the inside surface of each of the pipes adjacent to said pipe ends;
positioning a coupling member including at least one axial joint, defined by a first axial edge and a second axial edge defining a surface extending radially with respect to said coupling, within said pipe ends such that said second axial edge is between said coupling and the pipes at a location spaced apart from said first axial edge and said coupling spans the interior of said pipe ends and said continuous gasket members,
positioning an axial gasket member shaped to extend around the surface of said second axial edge at said axial joint between said continuous gasket members and between said coupling and said continuous gasket members, such that said second axial gasket member is positioned on the surface of said coupling facing the interior of said pipe ends adjacent to said second axial edge and extending beyond said second axial edge in the region of said continuous gasket members; and
expanding said coupling member to compress said continuous gasket members and said axial gasket member together so as to prevent leakage of fluid from within the pipes.

21. A method of of sealing a pair of adjacent pipe ends, comprising the steps of:
positioning a continuous gasket member against the inside surface of each of the pipes adjacent to said pipe ends;
positioning a coupling member including at least two axial joints within said pipe ends so as to span the interior of said pipe ends and said continuous gasket members;
positioning an axial gasket member at each of said axial joints between said continuous gasket members and between said coupling and said continuous gasket members; and
expanding said coupling member to compress said continuous gasket members and said axial gasket members so as to prevent leakage of fluid from within the pipes.

22. The method of claim 21, wherein said coupling member is defined by two sections extending between said axial joints, and wherein said step of positioning said coupling member comprises positioning one of said sections against a lower portion of said pipe ends, and then positioning the other of said sections on top of one section.

23. The method of claim 22, wherein said axial joints of said coupling member are each defined by a first axial edge of said lower section and a second axial edge of said top section, and wherein said step of positioning said coupling member comprises positioning said second axial edges between said lower section and the pipes at a location spaced apart from said first axial edges, and wherein said step of positioning said axial gasket members comprises positioning said axial gasket members along said second axial edges.

24. The method of claim 21, further comprising contracting each of said sections of said coupling member before positioning said sections to span the interior of said pipe ends, and wherein said step of positioning said coupling member includes releasing said sections from their contracted configurations.

25. A method of sealing a pair of adjacent pipe ends, comprising the step of:
positioning two discrete, continuous gasket members, one against the inside surface of the pipes adjacent to each of said pipe ends;
positioning a coupling member including at least one axial joint defined by a first axial edge and a second axial edge within said pipe ends so as to span the interior of said pipe ends and said continuous gasket members, said coupling member including a first flange extending into said pipes from the side of said coupling facing away from the inside of the pipes at a location spaced farther from said second axial edge than said first axial edge is spaced from said second axial edge, and a second flange extending into the pipes from said first axial edge;
positioning an axial gasket member along said second axial edge such that said axial gasket member bears against said coupling and said continuous gasket members to provide an axial seal to prevent fluids from passing through said axial joint; and
forcing said first and second axial flanges apart so as to force said first and second axial edges closer to one another to expand said coupling and compress said gasket members and said axial gasket member so as to prevent leakage of fluid from within said pipes.

* * * * *